US 6,954,653 B2

(12) United States Patent
Morita

(10) Patent No.: US 6,954,653 B2
(45) Date of Patent: Oct. 11, 2005

(54) CELLULAR PHONE SIMULTANEOUSLY MOUNTING TWO IC CARDS AND INCLUDING A LOCK BUTTON FOR SELECTIVELY RELEASING THE TWO IC CARDS

(75) Inventor: Yuichi Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 601 days.

(21) Appl. No.: 09/798,938

(22) Filed: Mar. 6, 2001

(65) Prior Publication Data

US 2001/0021657 A1 Sep. 13, 2001

(30) Foreign Application Priority Data

Mar. 7, 2000 (JP) ....................................... 2000-061722

(51) Int. Cl.[7] ................................................ H04B 1/38
(52) U.S. Cl. .................... 455/550.1; 455/558; 455/347; 379/433.06; 379/433.09
(58) Field of Search ......................... 455/550.1, 575.1, 455/561, 556.1, 558, 100, 556.2, 557, 425, 424, 90.3, 95, 344, 418, 346, 347, 348, 349, 420, 588; 439/76.1, 945, 92, 218, 630, 59, 62, 108, 152–160, 377, 638, 541.5, 593, 928.1, 945.946; 235/379, 380, 130 R, 133 R, 440, 492; 902/25, 26, 10, 22; 379/433.06, 433.09, 433.11, 433.12, 428.01, 428.04

(56) References Cited

U.S. PATENT DOCUMENTS

| | | | | | |
|---|---|---|---|---|---|
| 5,586,184 | A | * | 12/1996 | Piper | 379/433.08 |
| 5,655,918 | A | * | 8/1997 | Soh | 439/159 |
| 5,748,737 | A | * | 5/1998 | Daggar | 705/41 |
| 6,018,669 | A | * | 1/2000 | Stoegmueller | 455/558 |
| 6,062,887 | A | * | 5/2000 | Schuster et al. | 439/218 |
| 6,189,786 | B1 | * | 2/2001 | Itou et al. | 235/379 |
| 6,484,024 | B1 | * | 11/2002 | Darnault et al. | 455/418 |
| 2002/0160808 | A1 | * | 10/2002 | Uehara et al. | 455/558 |

FOREIGN PATENT DOCUMENTS

| | | |
|---|---|---|
| EP | 0 715 271 A2 | 11/1995 |
| JP | 10-208000 | 8/1998 |
| JP | 2000-49917 | 2/2000 |

* cited by examiner

Primary Examiner—Edward F. Urban
Assistant Examiner—Charles Chow
(74) Attorney, Agent, or Firm—McGinn IP Law Group, PLLC

(57) ABSTRACT

Disclosed is a cellular phone having a card connector composed of a first slot for inserting a first IC card and a second slot for inserting a second IC card. The second slot is disposed above said first slot so that the inserting direction of said first IC card and the inserting direction of said second IC card are mutually in vertical relation.

25 Claims, 3 Drawing Sheets

CELLULAR PHONE SIMULTANEOUSLY MOUNTING TWO IC CARDS AND INCLUDING A LOCK BUTTON FOR SELECTIVELY RELEASING THE TWO IC CARDS

FIELD OF THE INVENTION

The invention relates to a cellular phone capable of using an IC card equipped with a memory.

BACKGROUND OF THE INVENTION

A GSM (group special modem/global system for mobile communication) system is known as one of digital cellular systems for cellular phone. In this GMS system, an IC card (SIM card) is used as a subscriber identity module (SIM). In this case, it is necessary for the cellular phone to be equipped with a small and detachable card holder.

On the other hand, a service for obtaining data from a Web server on the Internet by using a cellular phone has started. In some cases, a memory card is used to store the data obtained and to use the data in other electronic appliance. Also in the cases, it is necessary for the cellular phone to be equipped with a small and detachable card holder.

In order to use both SIM card and memory card on a cellular phone, the cellular phone must be equipped with two card holders for the SIM card and memory card.

To attain the ultimate portability, the cellular phone employs a mounting board as small as possible, whose degree of integration is maximized. However, since the card holder has such a size as to accommodate the IC card, it occupies a quite larger space than that of other parts mounted on the mounting board of the cellular phone.

As mentioned above, in order to mount two card holders on the cellular phone, the two card holders must be mounted on the mounting board. This prevents the mounting board of cellular phone from being downsized.

Thus, hitherto, if attempted to use both SIM card and memory card on the cellular phone, the cellular phone must increase in size, which does not meet the request for reducing the size of cellular phone.

SUMMARY OF THE INVENTION

The invention is devised to solve such problems, and it is hence an object thereof to allow two IC cards to be simultaneously mounted without increasing the size of cellular phone.

According to the invention, a cellular phone, which is used fitting a battery pack into a battery fitting portion of the main body of the cellular phone, comprises:

a card connector that is composed of a first slot for inserting a first IC card and a second slot for inserting a second IC card;

wherein the second slot is disposed above the first slot so that the inserting direction of the first IC card into the first slot and the inserting direction of the second IC card into the second slot are mutually in vertical relation.

According to another aspect of the invention, a cellular phone, which is used fitting a battery pack into a battery fitting portion of the main body of the cellular phone, comprises:

a card connector composed of a first slot for inserting a first IC card and a second slot for inserting a second IC card, the second slot being disposed above the first slot so that the inserting direction of the first IC card into the first slot and the inserting direction of the second IC card into the second slot are mutually in vertical relation;

a mounting board on which the card connector is mounted; and a casing having the battery fitting portion, the mounting board being installed in the casing;

wherein an opening of the first slot of the card connector is disposed on the side of the casing, and an opening of the second slot of the card connector is disposed on the side of the battery fitting portion.

DESCRIPTION OF THE PREFERRED EMBODIMENT

A preferred embodiment of the invention is described below by referring to the accompanying drawings.

Figure 1:
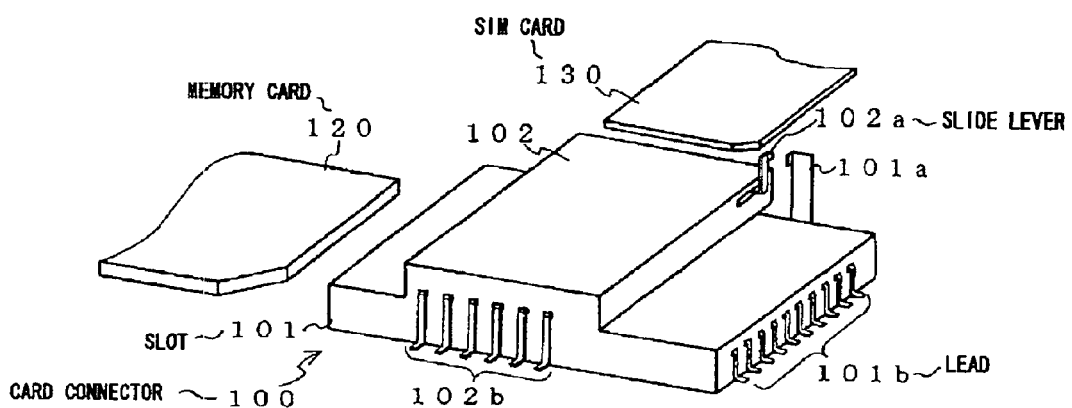
FIG. 1 is a perspective view showing a configuration of a card connector incorporated in a cellular phone in an embodiment of the invention.

FIG. 1 is a perspective view schematically showing a configuration of a card connector in an embodiment of the invention. As shown in FIG. 1, a card connector 100 of the embodiment comprises a slot 101 disposed in a lower stage and a slot 102 disposed above the slot 101, and is installed in a cellular phone not shown in FIG. 1. A detachable slot card 120 is always inserted in the slot 101, and a SIM card 130 storing information such as telephone number of user of cellular phone or the like is inserted in the slot 102. In the slot 101 and slot 102, the card inserting (or ejecting) directions are mutually in vertical relation.

In the card connector 100, the cards inserted in the slot 101 and slot 102 are taken out by slide levers 101a, 102a. The slot 101 is electrically connected to the specified wiring of the mounting board not shown in the drawing by means of leads 101b, and the slot 102 is electrically connected to the specified wiring of the mounting board by means of leads 102b.

In the slot 101, terminals (not shown) for connecting to the leads 101b are disposed at specified positions, when the memory card 120 is inserted into the slot 101, the terminals of the memory card 120 are in contact with and connected to the terminals in the slot 101. As a result, the terminals of the memory card 120 are connected to the specified wiring of the mounting board through the leads 101b from the terminals in the slot 101.

Similarly, in the slot 102, terminals (not shown) for connecting to the leads 102b are disposed at specified positions. When the SIM card 130 is inserted into the slot 102, the terminals of the SIM card 130 are in contact with and connected to the terminals in the slot 102. AS a result, the terminals of the SIM card are connected to the specified wiring of the mounting board through the leads 102b from the terminals in the slot 102.

Figure 2:
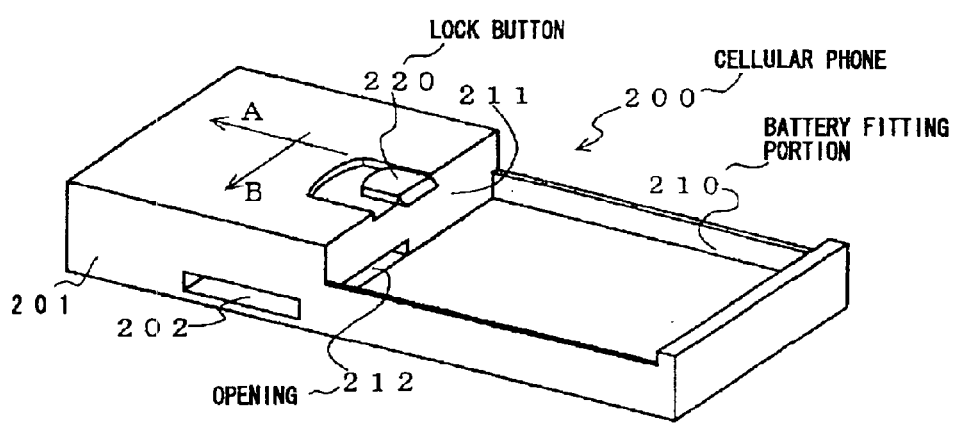
FIG. 2 is a perspective view showing a schematic appearance of the cellular phone in the embodiment of the invention.

FIG. 2 is a perspective view of the cellular phone in which the card connector of the embodiment is incorporated. FIG.

2 shows an example where the direction that the memory card as inserted into/ejected from the slot is 180 degrees different from that in FIG. 1.

In FIG. 2, a cellular phone 200 has an opening 212 on the side 211 of a battery fitting portion 210 for holding a battery pack for driving. The cellular phone 200 also has an opening 202 on the side 201 of the cellular phone 200.

The card connector 100 is installed in the side surface of the cellular phone 200 in the opposite direction of a memory card inlet, with a SIM card inlet disposed in the side surface of the battery fitting portion 210 of the cellular phone 200. Therefore, the SIM card 130 is inserted in the slot 102 from the opening 212, and the memory card 120 is inserted in the slot 101 from the opening 202. The opening 202 for the memory card may be disposed at either side of the cellular phone 200.

On the top of the side surface 211 of the battery fitting portion 210, there is a lock button 220 for fixing the battery pack to be fitted into the battery fitting portion 210. The lock button 220 is interlocked with the slide levers 101a, 102a shown in FIG. 1. When the lock button 220 slides in direction A, the fixed state of the battery pack is released in the battery fitting portion 210, and the slide lever 102a shown in FIG. 1 is interlocked at the same time to eject the SIM card 130. When the lock button 220 slides in direction B, the slide lever 101a is interlocked to eject, the memory card 120.

As described herein, according to the embodiment, fixing and releasing of battery pack, removal of SIM card, and removal of memory card can be done all by the lock button 220 alone.

Figure 3:
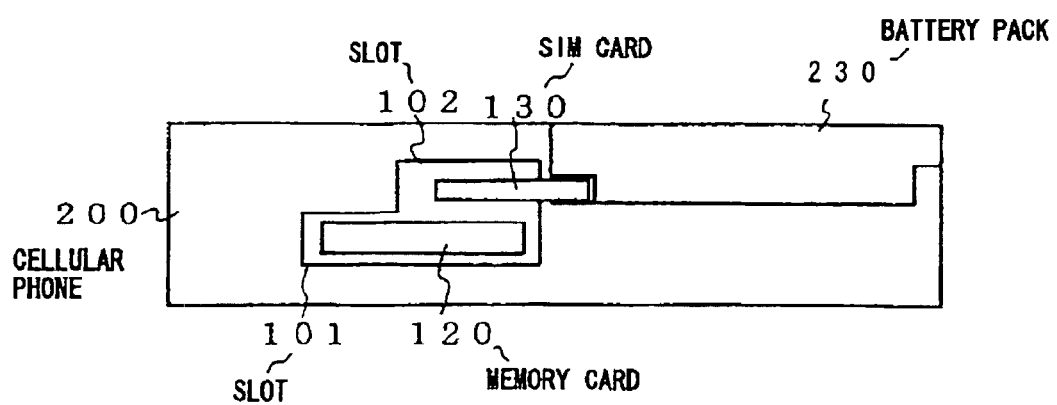
FIG. 3 is a sectional view schematically showing a section of the cellular phone in FIG. 2.

FIG. 3 is a sectional view schematically showing a section of the cellular phone 200 in FIG. 2. As shown in FIG. 3, the cellular phone 200 is used by installing the battery pack 230, and therefore the end face of the SIM card 130 inserted in the slot 102 is fixed by the installed battery pack 230. As a result, the cellular phone of the embodiment prevents the SIM card from popping out due to an impact shock during use.

On the other hand, the memory card 120 inserted in the slot 101 can be ejected freely even when the battery pack 230 is installed. This memory card 120 is removed by sliding the lock button 220 shown in FIG. 2 in direction B, and the lock button 220 does not slide in direction A. Therefore, without removing the battery pack 230 or SIM card 130, only the memory card 120 can be ejected.

Figure 4:
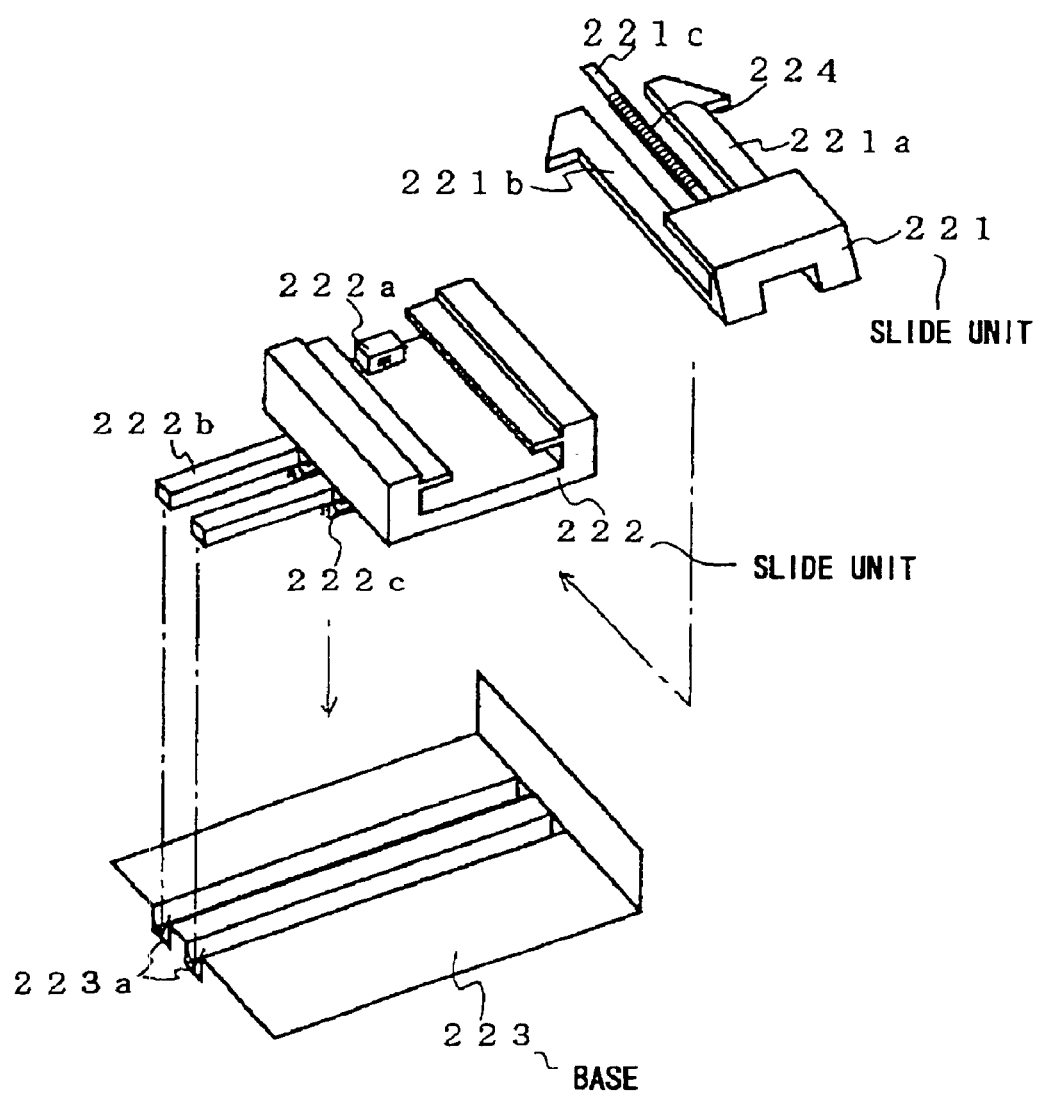
FIG. 4 is a perspective view showing a detailed structure of a lock button 220 in FIG. 2.

FIG. 4 is a perspective view showing a detailed structure of the lock button 220.

As shown in FIG. 4, the lock button 220 comprises a slide unit 221, a slide unit 222, and a base 223 provided in the cellular phone main body. The slide unit 221 slides in direction A in FIG. 2 as a holding portion 221a and a holding portion 221b are held by a slip guide on the slide unit 222.

The slide unit 221 has a slip bar 221c wound with a spring 224, and the slip bar 221c penetrates through a guide hole 222a provided in the end face of the slide unit 222. By this mechanism, the slide unit 221 slides back on the slide unit 222.

The slide unit 221 is interlocked with the slide lever 102a shown in FIG. 1, and as the slide unit 221 slides on the slide unit 222, the slide lever 102a is put in operation.

The slide unit 222 has a slip bar 222b extending in direction B in FIG. 2 provided in its lower part, and is engaged with a guide groove 223a of the base 223, and slides in direction B. The slide unit 222 is fixed to the base 223 (guide groove 223a) by means of a claw 222c, and is limited in the move in the normal direction on the plane of the base 223. The slide unit 222 is interlocked with the slide lever 101a in FIG. 1, and as the slide unit 222 slides on the base 223, the slide lever 101a is put in operation.

As described herein, in the embodiment, two slots differing in the inserting direction of two IC cards are overlaid in two stages, and the occupied area in the mounting board of the cellular phone is reduced. Since two slots are different in the inserting direction, the inlet of one slot may be disposed on the side of the battery pack fitting portion of the cellular phone, and the inlet of other slot may be disposed on the side surface of the cellular phone. As a result, the IC card inserted in one slot can be fixed to the cellular phone by fitting the battery pack.

According to the invention as described herein, the first and second slots for inserting IC cards are overlaid in two stages, and the card connector for inserting IC cards in different directions are used, and therefore two IC cards can be used without requiring the mounting area for two IC cards on the mounting board of the cellular phone, and excellent effects are obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A cellular phone, fitting a battery pack into a battery fitting portion of a main body of said cellular phone, comprising:

a card connector that comprises:
      a first slot for inserting a first integrated circuit card; and
      a second slot for inserting a second integrated circuit card, and
   a lock button for selectively releasing said first integrated circuit card from said first slot and said second integrated circuit card from said second slot based upon a direction of operation of said lock button,
   wherein said second slot is disposed above said first slot so that an inserting direction of said first integrated circuit card into said first slot and an inserting direction of said second integrated circuit card into said second slot are substantially perpendicular to each other, and
   wherein operating said lock button in a first direction releases said first integrated circuit card and operating said lock button in a second direction, that is different than said first direction, releases said second integrated circuit card.

2. A cellular phone, according to claim 1, wherein said second integrated circuit card inserted into said second slot comprises a subscriber identity module card to store information about a user of said cellular phone.

3. The phone of claim 1, wherein said lock button comprises:

a base in the main body;
   a first slide unit slideable in a first direction relative to said base; and
   a second slide unit slideable in a second direction relative to said base.

4. The phone of claim 3, wherein said first slide comprises a holding portion held onto the second slide unit by a slip bar.

5. The phone of claim 4, wherein said first slide further comprises a spring on said slip bar and wherein said slip bar penetrates a guide hole in the second slide unit.

6. The phone of claim 3, wherein the second slide comprises a slip bar engaging a guide groove in said base.

7. The phone of claim 3, wherein said second slide comprises a claw slideably fixing said second slide to said base.

8. A cellular phone, fitting a battery pack into a battery fitting portion of a main body of said cellular phone, comprising:
a card connector comprising:
a first slot for inserting a first integrated circuit card; and
a second slot for inserting a second integrated circuit card, said second slot being disposed above said first slot so that an inserting direction of said first integrated circuit card into said first slot and an inserting direction of said second integrated circuit card into said second slot are substantially perpendicular to each other;
a mounting board on which said card connector is mounted;
a casing having said battery fitting portion, said mounting board being installed in said casing; and
a lock button for selectively releasing said first integrated circuit card from said first slot and said second integrated circuit card from said second slot based upon a direction of operation of said lock button,
wherein an opening of said first slot of said card connector is disposed on a side of said casing,
an opening of said second slot of said card connector is disposed on a side of said battery fitting portion, and
wherein operating said lock button in a first direction releases said first integrated circuit card and operating said lock button in a second direction, that is different than said first direction, releases said second integrated circuit card.

9. A cellular phone, according to claim 8, further comprising:
a first slide lever for ejecting said first integrated circuit card inserted in said first slot;
a second slide lever for ejecting said second integrated circuit card inserted in said second slot; and
a fixing mechanism for conducting a first direction sliding in the inserting direction of said first integrated circuit card into said first slot, and a second direction sliding in the inserting direction of said second integrated circuit card into said second slot, and for switching between a fixed state and a non-fixed state of said battery pack into said battery fitting portion by said first direction sliding;
wherein the operation of said first slide lever is interlocked with said first direction sliding of said fixing mechanism, and the operation of said second slide lever is interlocked with said second direction sliding of said fixing mechanism, wherein said lock button slidably engages each of said first slide lever and said second slide lever.

10. A cellular phone, according to claim 9, wherein said second integrated circuit card inserted into said second slot comprises a subscriber identity module card to store information about a user of said cellular phone.

11. A cellular phone, according to claim 8, wherein said second integrated circuit card inserted into said second slot comprises a subscriber identity module card to store information about a user of said cellular phone.

12. A cellular phone comprising:
a main body;
a mounting board enclosed by the main body;
a card connector mounted on the mounting board, wherein the card connector comprises:
a first slot disposed in a first direction; and
a second slot disposed in a second direction that is different from the first direction; and
a lock button for selectively releasing a first integrated circuit card from said first slot and a second integrated circuit card from said second slot based upon a direction of operation of said lock buttons,
wherein operating said lock button in a first direction releases said first integrated circuit card and operating said lock button in a second direction, that is different than said first direction, releases said second integrated circuit card.

13. The phone of claim 12, wherein said first integrated circuit comprises a subscriber identity module card.

14. The phone of claim 12, wherein said second integrated circuit comprises a memory card.

15. The phone of claim 12, wherein the first direction is substantially perpendicular to the second direction.

16. The phone of claim 12, wherein said main body comprises a battery fitting portion.

17. The phone of claim 16, wherein one of the first direction and the second direction is in a direction of the battery fitting portion.

18. The phone of claim 17, wherein the first direction is in the direction of the battery fitting portion, said first integrated circuit comprises a subscriber identity module card and said second integrated circuit comprises a memory card.

19. The phone of claim 12, wherein the first slot is vertically disposed relative to the second slot.

20. The phone of claim 12, wherein the card connector further comprises:
a first set of leads adapted to connect said first integrated circuit card inserted into the first slot to a corresponding set of leads on the mounting board; and
a second set of leads adapted to connect said second integrated circuit card inserted into the second slot to a corresponding set of leads on the mounting board.

21. The phone of claim 12, wherein said lock button further releasably fixes a battery into a battery fitting portion of said main body.

22. The phone of claim 21, wherein said card connector further comprises:
a first slide lever for ejecting said first integrated circuit card from said first slot; and
a second slide lever for ejecting said second integrated circuit card from said second slot, wherein said lock button slidably engages each of said first slide lever and said second slide lever.

23. The phone of claim 22, wherein said lock button slides in said first direction to release said battery and to engage said first slide lever to eject said first integrated circuit card from said first slot.

24. The phone of claim 23, wherein said lock button slides in said second direction to engage said second slide lever to eject said second integrated circuit card from said second slot.

25. The phone of claim 12, wherein said second slot is disposed above said first slot so that an inserting direction of said first integrated circuit card into said first slot and an inserting direction of said second integrated circuit card into said second slot are mutually in vertical relation.

* * * * *